US006959598B2

(12) United States Patent
Peterson et al.

(10) Patent No.: US 6,959,598 B2
(45) Date of Patent: Nov. 1, 2005

(54) LIQUID LEVEL SENSOR FOR APPLIANCE AND ASSOCIATED METHOD

(75) Inventors: Gregory A. Peterson, South Barrington, IL (US); James W. Ensinger, Buffalo Grove, IL (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 10/770,595

(22) Filed: Feb. 3, 2004

(65) Prior Publication Data

US 2005/0166671 A1    Aug. 4, 2005

(51) Int. Cl.[7] .............................................. G01F 23/00
(52) U.S. Cl. ................................. 73/290 V; 73/290 R
(58) Field of Search ......................... 73/290 R, 290 V, 73/304 C

(56) References Cited

U.S. PATENT DOCUMENTS

| | | | | |
|---|---|---|---|---|
| 3,477,258 A | * | 11/1969 | Tichy et al. ................ 68/12.05 |
| 3,981,194 A | | 9/1976 | Blise et al. ................. 73/861.78 |
| 5,052,223 A | * | 10/1991 | Regnault et al. ........... 73/304 C |
| 5,142,909 A | * | 9/1992 | Baughman ................. 73/304 C |
| 5,144,835 A | * | 9/1992 | McDonald ................. 73/304 C |
| 5,477,727 A | * | 12/1995 | Koga ........................ 73/304 C |
| 5,832,772 A | | 11/1998 | McEwan .................... 73/290 R |
| 5,862,431 A | * | 1/1999 | Christensen ................. 399/27 |
| 6,025,788 A | | 2/2000 | Diduck .................... 340/870.16 |
| 6,097,297 A | | 8/2000 | Fard .......................... 340/604 |
| 6,183,054 B1 | * | 2/2001 | Froger et al. ................. 347/7 |
| 6,192,752 B1 | | 2/2001 | Blaine ....................... 73/290 R |
| 6,539,797 B2 | * | 4/2003 | Livingston et al. ....... 73/304 C |
| 6,546,795 B1 | | 4/2003 | Dietz ........................ 73/290 R |
| 6,561,024 B2 | | 5/2003 | Bell ............................. 73/431 |
| 6,571,070 B2 | * | 5/2003 | Oguma et al. ................ 399/27 |
| 6,606,904 B2 | | 8/2003 | Muller et al. ............. 73/290 V |
| 6,614,391 B1 | | 9/2003 | Burger et al. ............... 342/124 |
| 6,810,732 B2 | * | 11/2004 | Shon ........................ 73/304 R |
| 2002/0075163 A1 | | 6/2002 | Smith et al. ........... 340/870.16 |
| 2002/0083767 A1 | | 7/2002 | Kemp ......................... 73/292 |

* cited by examiner

Primary Examiner—Hezron Williams
Assistant Examiner—Rodney T. Frank
(74) Attorney, Agent, or Firm—Harness, Dickey & Pierce, PLC

(57) ABSTRACT

A liquid level sensor for an appliance having a container in which liquid flows, and associated method. The sensor comprises a radio frequency oscillator and an antenna array connected to an input port of the oscillator. The antenna array comprises a longitudinal strip and a plurality of conductive fingers extending therefrom. The antenna array is mounted on the appliance in the proximity of the container such that each finger corresponds to a respective level in the container. The sensor includes an output port interconnected with the radio frequency oscillator and outputting a frequency step indicative of the container level to which liquid has reached.

25 Claims, 3 Drawing Sheets

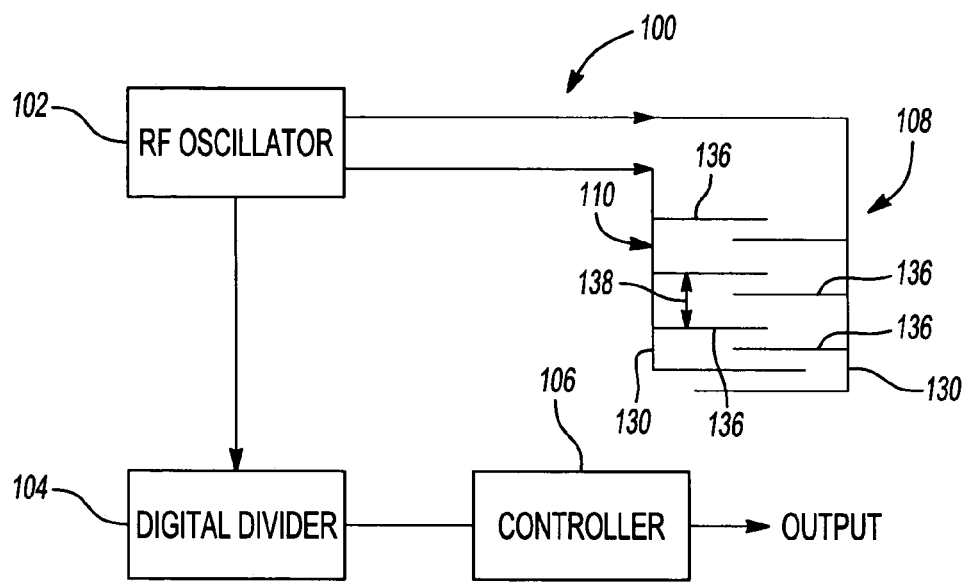
*Fig-1*
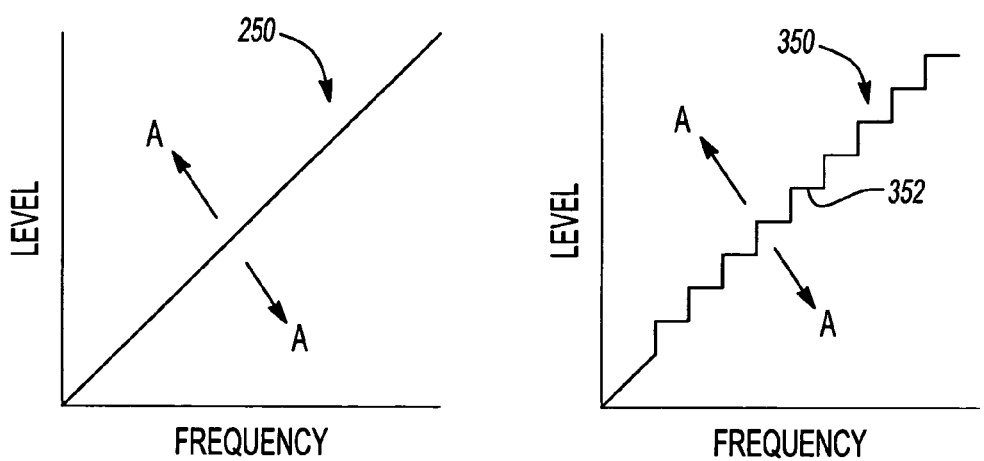
*Fig-2*
PRIOR ART
*Fig-3*

LIQUID LEVEL SENSOR FOR APPLIANCE AND ASSOCIATED METHOD

FIELD OF THE INVENTION

The present invention relates to a liquid level sensor for an appliance and associated method.

BACKGROUND OF THE INVENTION

Many household appliances, such as, for example, clothes washers and dishwashing machines are equipped with water conservation devices, including water level controls. These devices may require user input in the form of selection of a cycle type, or cycle duration or estimate of water level required based on the load.

Conventional top-load washing machines, for example, include a pressure switch that is either fixed or variable to determine the water level when filling the washing machine. In a variable pressure switch, the user controls and may vary the fill water level by selecting a setting on an associated dial every time the washing machine is used. Often, however, the user guesses incorrectly the appropriate fill level or fails to reset or adjust the water level for each clothes load. This leads to over-consumption of water and inefficient energy use for heating the water.

Federal regulations provide manufacturer incentives, for example in the form of energy credits, to develop more water and energy efficient machines, reducing hot water consumption. Recognizing that reliance on the user to correctly determine and remember to reset the water level switch is not an effective method to conserve energy, regulatory agencies do not give credits toward energy use limits to manufacturers of washing machines that have user-controlled water level features.

One way of addressing water conservation requirements is by using passive water level controls that rely on some type of water level sensors rather than user input, without increasing the cost of the appliance to an uncompetitive price. Therefore, improved, accurate and cost-effective water level sensors for appliances are desirable.

SUMMARY OF THE INVENTION

In one embodiment, the invention provides a liquid level sensor for an appliance having a container receiving a liquid. The sensor comprises a radio frequency oscillator and an antenna array connected to an input port of the oscillator. The antenna produces a stepwise signal, each step indicative of a level reached by the liquid in the container. The antenna array comprises a longitudinal strip and a plurality of conductive fingers extending therefrom. The antenna array is mounted on the appliance in the proximity of the container, such that each finger is associated with a corresponding level in the container. The sensor includes an output port interconnected with the radio frequency oscillator and outputting the stepwise signal.

In another embodiment, the invention provides a method for determining the level of liquid flowing into a container of an appliance. The method comprises mounting an radio frequency sensor having an input port on the appliance, and connecting the input port to an antenna array that has fingered extensions, which correspond to selected liquid level measurements.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 1 is a block diagram of an embodiment of a radio frequency sensor according to the present invention;

FIG. 2 is an illustrative graph of oscillation frequency vs. water level for a prior art radio frequency sensor;

FIG. 3. is an illustrative graph of oscillation frequency vs. liquid level for the radio frequency sensor of FIG. 1;

DETAILED DESCRIPTION OF PREFERRED EMBODIMENTS

The following description of preferred embodiments is merely exemplary in nature and is in no way intended to limit the invention, its application, or uses.

Figure 4:
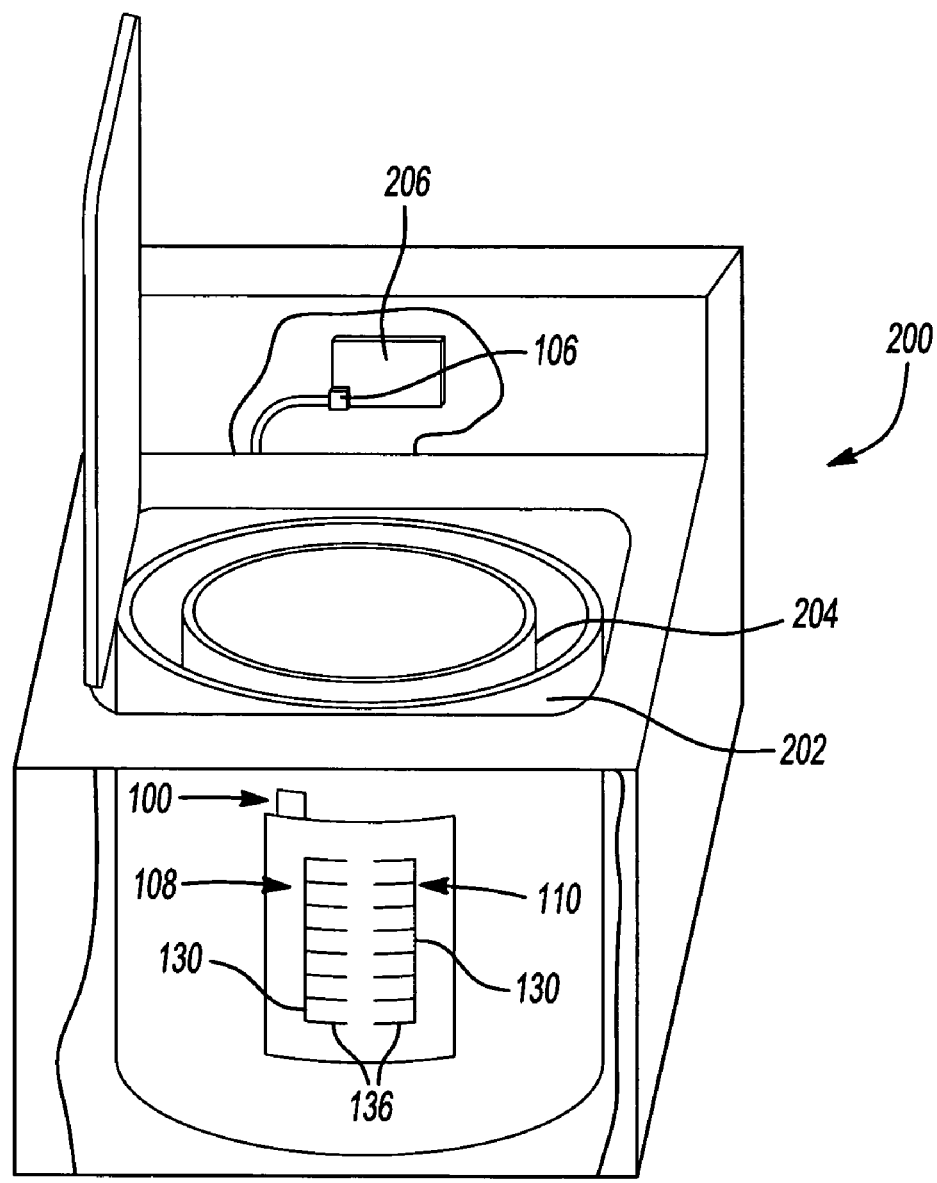
FIG. 4 shows an embodiment of an antenna array of FIG. 1 mounted on an appliance.

FIG. 1 illustrates a block diagram for an embodiment of a radio frequency (RF) sensor 100 according to the invention. The sensor 100 comprises an RF oscillator 102 and a first external antenna array 108. In one embodiment, the sensor 100 may comprise a digital divider 104, a controller 106, and/or a second external antenna array 110. The RF oscillator 102 is well-known in the art and can be made from standard components or obtained commercially. An exemplary circuit for the RF oscillator 102 is included in the circuit shown in FIG. 5. Referring to FIG. 4, to control the level of water or other liquid in a 202 container of an appliance 200, such as, for example, a clothes washing machine, a dishwasher, a bathtub, a hot tub, a Jacuzzi, etc., the oscillation frequency of the RF oscillator 102 is commonly set in the range of 1–50 MHz with no liquid in the container of the appliance. The digital divider 104 can be used to reduce the output frequency of the RF oscillator 102 to a frequency of magnitude that can be counted by a controller 106, such as the micro-control unit used in the control console 206 of the appliance 200. It will be appreciated, that although the appliance 200 depicted in FIG. 4 is a washing machine, the invention is not so limited.

Figure 5:
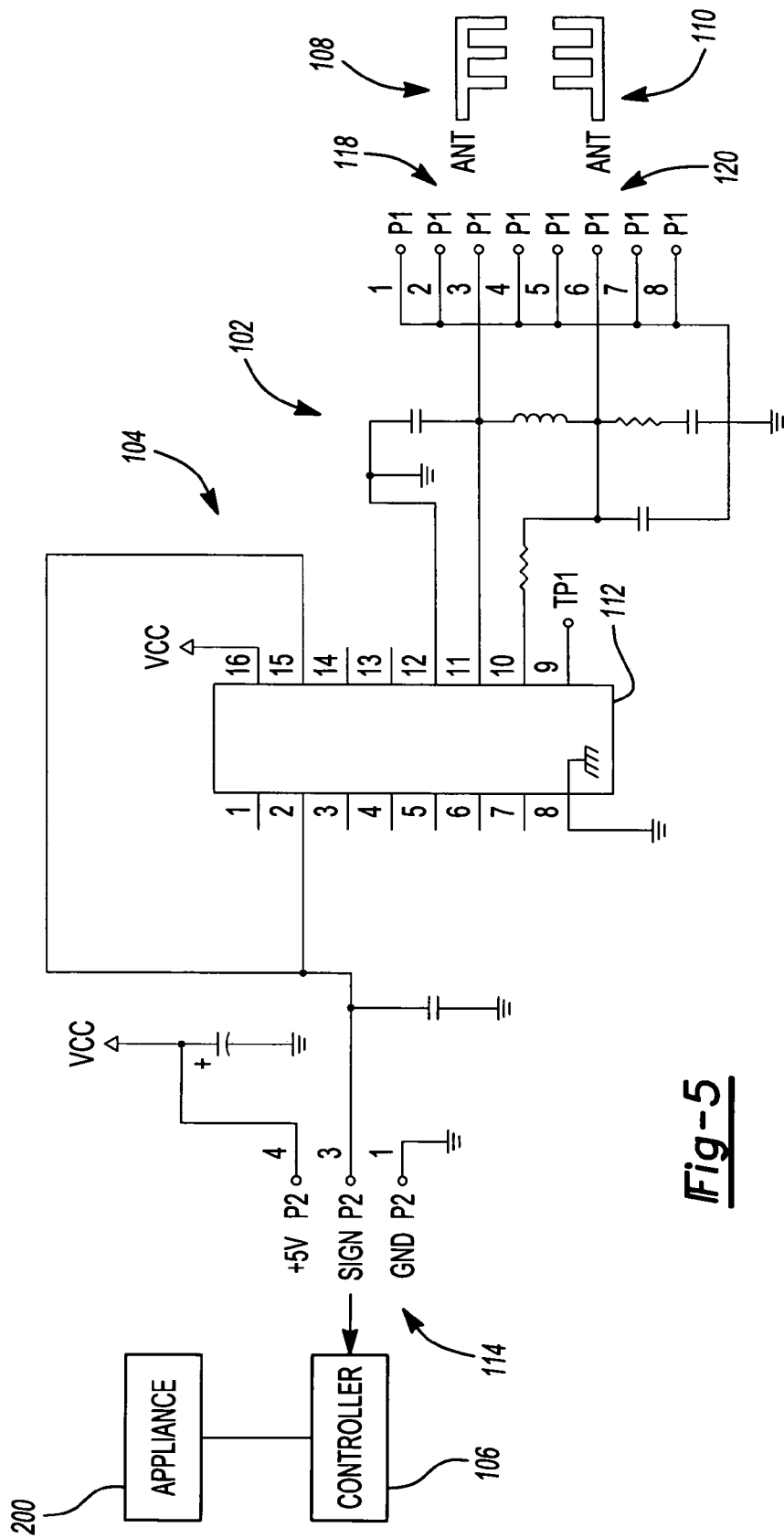
FIG. 5 is a partial circuit diagram for the sensor of FIG. 1.

The digital divider 104 can be, for example, an integrated circuit (IC) 112, such as the 74HC4060 IC or an equivalent IC. FIG. 5 illustrates the digital divider 104 integrated in the exemplary circuit for the RF oscillator 102. Various oscillator frequencies can be achieved by modifying the characteristics of the circuit of FIG. 5, by methods known in the art.

The RF oscillator 102 may comprise first and second input ports 118, 120, which are connected to the first and second antenna arrays 108, 110. The output signal, after reduction by the digital divider 104, is sent from the output port 114 to the micro-controller 106 that resides in the control console 206 of the appliance 200, when the sensor 100 is used in connection with the appliance 200.

With reference to FIGS. 1 and 4, each of the antenna arrays 108, 110, is mounted on the appliance 200 in the vicinity of or on the container 202. Each antenna array 108, 110 comprises a longitudinal conductive strip 130 and a plurality of conductive fingers 136. The longitudinal strip 130 can be mounted vertically on the outside of the container 202, which is associated with liquid rise in the appliance 200. The container 202 can be, for example, the external tub of a washing machine. Both antenna arrays 108, 110 can be mounted on the container to provide a balanced frequency signal. It is possible, however, to omit one of the antenna arrays 108, 110. When the appliance 200 is a washing machine, for example, the container 202 is the outer tub, which is often made of plastic. An inner tub 204, usually made of metal, can take the place of the second antenna 110. The RF oscillator 102 and the digital divider 104 can also be mounted directly on the container 202. The output signal of the sensor 100 is directed to the microcontroller 106 in the control console 206 of the appliance 200.

A prior art RF water level sensor has a straight vertical antenna that, in operation, produces a monotonic (linear or nonlinear) oscillation frequency versus water level signal 250, as is represented in FIG. 2. The presence of impurities or inhomogeneities in the liquid can cause the frequency signal 250 to drift in the direction of the arrows "A". In a washing machine, for example, the presence of soap bubbles, lint, contaminants and/or other particles, as well as the movement of clothes, may cause the frequency line 250 to drift in the direction of the arrows A, thus making the determination of water level from the output frequency imprecise. In contrast, the sensor 100 of the invention produces a "stepwise" frequency vs. level signal 350. Each step 352 of the stepwise signal 350 corresponds to container liquid reaching the level of a corresponding antenna finger 136. Each frequency step 352 provides a punctuation that is unaffected by any frequency drift in the direction of the arrows A. Accordingly, a precise liquid level indication can be obtained from the RF sensor 100 of the invention, even in the presence of impurities, inhomogeneities or any other conditions that cause the frequency line 250 of the prior art sensors to drift.

The spacing 138 between the antenna fingers 136 may be selected to provide a predetermined sampling frequency for the liquid level in the container 202 of the appliance 200. The spacing 138 may be constant or variable. Smaller spacing 138, that corresponds to more frequent sampling for liquid level measurements, may be desirable, for example, at container levels that correspond to estimates for small, medium, and large loads, and/or for container levels that correspond to pre-soaking, washing and rinsing functions.

It will be appreciated that liquid level sensor 100 of the invention provides very accurate liquid level measurements with minimal expenditure for components and is readily incorporated in any appliance 200 where automated measurement of liquid fill level is desirable. Furthermore, the frequency of sampling and the sampling levels can be readily adjusted by selecting the position and spacing of the antenna array fingers 136 relative to selected container levels.

While various embodiments of the invention have been described, it will be apparent to those of ordinary skill in the art that other embodiments and implementations are possible that are within the scope of this invention. Accordingly, the invention is not restricted except in light of the attached claims and their equivalents.

What is claimed is:

1. A liquid level sensor for an appliance having a container receiving a liquid, the sensor comprising:
    a radio frequency oscillator; and
    a first antenna array connected to a first input port of the oscillator, the first antenna array mounted on the appliance in the proximity of the container such that it is not contacted by the liquid, the antenna producing a stepwise signal, each step indicative of a level reached by the liquid in the container.

2. The sensor of claim 1, wherein the first antenna array comprises a first longitudinal strip and a plurality of conductive fingers extending therefrom, each finger associated with a corresponding level in the container.

3. The sensor of claim 2, further comprising an output port interconnected with the radio oscillator and outputting the stepwise signal.

4. The sensor of claim 3, further comprising a second antenna array connected to a second input port of the oscillator.

5. The sensor of claim 4, wherein the first antenna array is attached to a non conductive outer surface of the appliance.

6. The sensor of claim 4, wherein the container is conductive and the comprises the second antenna array.

7. The sensor of claim 4, wherein the second antenna array comprises a second conductive strip with a plurality of conductive fingers extending therefrom.

8. The sensor of claim 1, further comprising a digital frequency divider connected to the oscillator.

9. The sensor of claim 8, further comprising a controller operably connected to the digital frequency divider, and controlling the liquid level in the container.

10. The sensor of claim 9, wherein the appliance is selected from the group consisting of a clothes washer, a dishwasher, a bathtub, a hot tub and a Jacuzzi.

11. The sensor of claim 2, wherein the fingers are oriented at an angle with the strip.

12. The sensor of claim 11, wherein the fingers are equally spaced.

13. The sensor of claim 11, wherein the fingers are horizontal.

14. The sensor of claim 11, wherein the fingers are variably spaced.

15. A method of determining the level of a liquid received in a container of an appliance, the method comprising:
    providing an RF oscillator having first and second input ports;
    providing a first antenna array comprising a first longitudinal strip and a plurality of conductive fingers extending therefrom;
    connecting the first antenna array to the first port; and
    attaching the first antenna array on the appliance such that it is not in contact with the liquid and each conductive finger corresponds to a level in the container.

16. The method of claim 15, further comprising:
    connecting the second port to a second antenna array; and
    attaching the second antenna array to the appliance.

17. The method of claim 15, further comprising attaching the first antenna array to a non-conductive portion of the appliance.

18. The method of claim 16, further comprising using a conductive portion of the appliance as the second antenna.

19. The method of claim 16, further comprising proving a second antenna comprising a second longitudinal strip and a plurality of conductive fingers extending therefrom, each finger corresponding to a level in the container.

20. A method of determining a level of a liquid received in the interior of a container of an appliance, the method comprising:
providing a first antenna array comprising a plurality of fingers corresponding to pre-selected container levels;
connecting the first antenna array to an input port of a radio frequency oscillator;
mounting the oscillator and the first antenna array on the exterior of the container; and
obtaining an oscillator output indicating a frequency step when the liquid reaches one of the pre-selected container levels.

21. The method of claim 20, further comprising:
providing a second antenna array; connecting the second antenna array to the oscillator; and
mounting the second antenna array on the appliance.

22. A method of determining the level of a liquid flowing into the interior of a container of an appliance, the method comprising:
providing a radio frequency sensor having an input port;
mounting the radio frequency sensor on the appliance;
providing an antenna array having fingered extensions that correspond to selected liquid level measurements;
connecting the input port to the antenna array; and
attaching the antenna array on the appliance such that it is not able to contact the liquid.

23. The method of claim 22, further comprising orienting the fingered extensions horizontally.

24. The method of claim 22, further comprising orienting the fingered extensions at an angle with a longitudinal strip of the antenna array.

25. The method of claim 22, further comprising attaching the antenna array to a non-conductive portion of the appliance.

* * * * *

UNITED STATES PATENT AND TRADEMARK OFFICE
CERTIFICATE OF CORRECTION

PATENT NO. : 6,959,598 B2
APPLICATION NO. : 10/770595
DATED : November 1, 2005
INVENTOR(S) : Gregory A. Peterson et al.

It is certified that error appears in the above-identified patent and that said Letters Patent is hereby corrected as shown below:

Column 1,
Line 60, after "mounting," "an" should be --a--.

Column 4,
Line 26, claim 6, after "and" delete "the".

Column 5,
Line 1, claim 19, "proving" should be --providing--.

Signed and Sealed this

Twenty-fifth Day of July, 2006

JON W. DUDAS
*Director of the United States Patent and Trademark Office*